C. F. ERICKSON.
RESILIENT TIRE.
APPLICATION FILED APR. 25, 1916.
1,228,305.
Patented May 29, 1917.
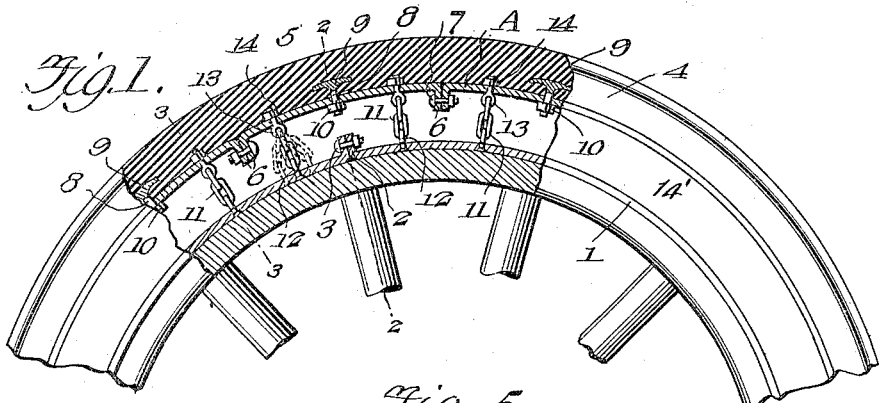
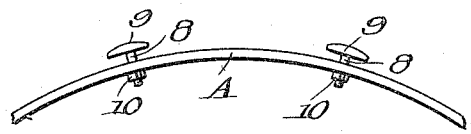
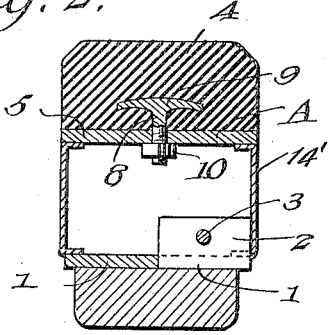
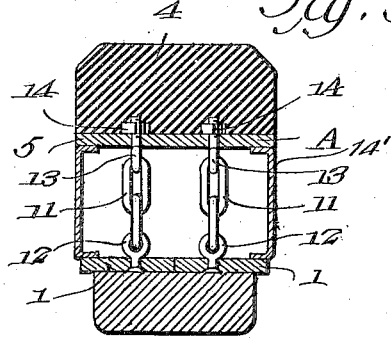
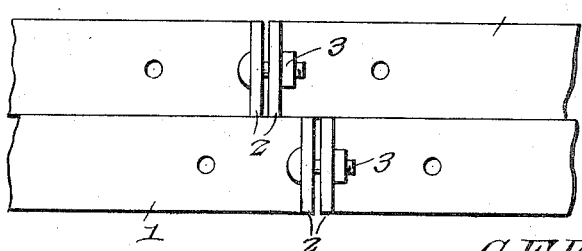
Witnesses
Hugh H. Ott
P. M. Smith
Inventor
C. F. Erickson
By Victor J. Evans
Attorney

UNITED STATES PATENT OFFICE.

CHARLES F. ERICKSON, OF BROOKLYN, NEW YORK.

RESILIENT TIRE.

1,228,305.   Specification of Letters Patent.   Patented May 29, 1917.

Application filed April 25, 1916. Serial No. 93,452.

*To all whom it may concern:*

Be it known that I, CHARLES F. ERICKSON, a subject of the King of Sweden, residing at Brooklyn, in the county of Kings and State of New York, have invented new and useful Improvements in Resilient Tires, of which the following is a specification.

This invention relates to resilient tires, the object in view being to provide a nonpuncturable, blow-out proof tire in which the tread portion of the tire is supported in spaced relation to the inner bands thereof but connected therewith by flexible means which will admit of any desired relative adjustment and movement between the tread supporting means and the inner bands in order to compensate for wear and also to accommodate the tire as a whole to different loads imposed thereon.

With the above and other objects in view, the invention consists in the novel construction, combination and arrangement of parts, as herein described, illustrated and claimed.

In the accompanying drawings:—

Figure 1 is a side elevation partly in section of a tire embodying the present invention.

Fig. 2 is a cross section through the same on an enlarged scale on the line 2—2 of Fig. 1.

Fig. 3 is a similar section on the line 3—3 of Fig. 1.

Fig. 4 is a fragmentary outer face view of the meeting ends of the inner bands.

Fig. 5 is a fragmentary edge view of one of the outer sections modified to show a plurality of fasteners for each tread section.

The tire contemplated in this invention comprises, in the preferred embodiment thereof, a plurality of inner bands 1, two of such bands being illustrated in the drawings. These bands are of the same diameter or size and are arranged side by side. Each band 1 is split and provided adjacent to the meeting extremities thereof with outwardly projecting flanges 2 which receive a clamping bolt 3 whereby the band may be tightly drawn around the fixed rim or felly of a wheel for the purpose of securing the tire thereon. Either one of the bands 1 may be loosened and adjusted circumferentially or longitudinally of the rim of the wheel without disturbing the other band, the purpose of which will presently appear.

The tire also comprises an outer tread section 4 preferably of rubber or containing rubber in order to provide the requisite degree of resiliency therein. The tread 4 is supported by means of an outer band designated generally at A and made up of a circular series of resilient sections 5 each of which is provided with inturned end flanges 6 fastened together by bolts 7 or the equivalent thereof. The construction just referred to enables any one of the sections 5 to be removed in case of breakage and a new section substituted therefor.

The tread 4 is fastened to each of the sections 5 of the outer band by means of one or more bolts 8 each having an enlarged or flanged head 9 which is embedded or molded in the tread 4 as illustrated in the drawings. The shank of the bolt 8 extends through the adjacent section 5 of the outer band and is secured by means of a nut 10. In this way the tread 4 is securely anchored at numerous intervals to the sectional outer band A.

The sections 5 are connected with the inner bands 1 by means of flexible connections 11 shown in the form of chains although it will be apparent that cables or other flexible material or device may be substituted for the chains illustrated in the drawings. The inner end of each chain is connected to one of the bands 1 by means of an I bolt 12 and is similarly connected to the adjacent section 5 of the outer band by an I bolt 13 held in place by a nut 14 embedded or sunk in the inner face of the tread 4. Flexible annular guards 14′ close in the space between the outer band 5 and the inner bands 1 and serve to exclude foreign matter therefrom.

From the foregoing description, taken in connection with the accompanying drawings it will now be understood that the tread is supported by and anchored to the outer band which is made up of sections which are interchangeable so that a new section may be substituted for any other section which has been fractured or injured in any way. The tread supporting band is in turn anchored at numerous points to the inner bands which are clamped around the fixed rim or felly of the wheel.

In case it is desired or necessary to take up slack between the outer band A and the inner bands 1, one of the inner bands may be loosened and partially turned around the rim so as to give a slant to the flexible connections 11 which serve to limit the motion of the outer band A relatively to the body of the wheel. The resiliency is provided by the tread 4 and the band A which is preferably composed of resilient material such as spring metal.

Having thus described my invention, I claim:—

A resilient tire comprising a plurality of inner bands lying side by side, means for clamping said bands independently of each other around the felly of a wheel, an outer resilient band, a tread supported by said outer band, and a series of flexible suspending connections between said outer band and each of said inner bands, the latter being adjustable independently of each other and circumferentially of the felly.

In testimony whereof I affix my signature in presence of two witnesses.

CHARLES F. ERICKSON.

Witnesses:
ANNE T. DAWNEY,
RUSSELL D. STREETER.

Copies of this patent may be obtained for five cents each, by addressing the "Commissioner of Patents, Washington, D. C."